March 6, 1962 W. F. CLEMENT ET AL 3,023,574
PRESSURE REGULATED GAS GENERATOR
Filed Sept. 25, 1959 3 Sheets-Sheet 1

INVENTORS
WARREN F. CLEMENT
JOSEPH E. ZUPANICK
BY
ATTORNEY

March 6, 1962  W. F. CLEMENT ET AL  3,023,574
PRESSURE REGULATED GAS GENERATOR
Filed Sept. 25, 1959  3 Sheets-Sheet 3

INVENTORS
WARREN F. CLEMENT
JOSEPH E. ZUPANICK
BY
ATTORNEY

United States Patent Office 3,023,574
Patented Mar. 6, 1962

3,023,574
PRESSURE REGULATED GAS GENERATOR
Warren F. Clement, Glenhead, and Joseph E. Zupanick, Westbury, N.Y., assignors to Sperry Rand Corporation, Great Neck, N.Y., a corporation of Delaware
Filed Sept. 25, 1959, Ser. No. 842,367
11 Claims. (Cl. 60—39.13)

This invention relates generally to gas generators and more particularly to a generator employing fuel which is consumed at a rate that increases with increasing pressure on the fuel, said generator utilizing the particular fuel expenditure rate versus pressure characteristic to control the generation of gas.

When fuel of the aforementioned type is consumed within a closed container, gas resulting from the fuel consumption operates to further increase the pressure on the fuel and thus accelerate the rate of fuel expenditure. Therefore, to minimize an excessive fuel expenditure rate, a relief valve is usually installed on the fuel container to discharge gas when a preset value is exceeded. While this approach to the fuel consumption rate problem is adequate in many instances, it leaves much to be desired.

The instant invention employs to advantage the particular characteristic of the fuel which formerly operated to increase the rate of fuel expenditure. An accumulator or gas demand chamber is connected via a valve to a fuel-containing chamber. As gas is generated by the consumption of fuel, the gas passes through the opened valve into the accumulator. When the pressure within the accumulator reaches a preset value, the valve is closed. An escape valve mounted in a wall of the fuel container is opened at the same time that the first-mentioned valve is closed, thus enabling gas under high pressure in the fuel container to escape to the low pressure atmosphere. When a gas operated servo or the like, connected to the output of the accumulator calls for a quantity of gas, the pressure within the accumulator falls. At this occurrence the first-mentioned valve is opened and the escape valve is closed, thus applying the high pressure gas of the accumulator onto the fuel in the fuel container. The fuel expenditure rate, and hence the gas generation rate, is thus augmented by the application of high pressure gas on the fuel. The generated gas is now passed through the opened valve connecting the accumulator and the fuel container and increases the pressure in each of these containers. When the accumulator pressure increases to some predetermined value, the first-mentioned valve is closed and the escape valve is opened to remove the high pressure from the fuel. Thus, the particular characteristic of the fuel utilized in the gas generator is advantageously employed to generate large quantities of gas upon demand and minimize fuel consumption during no-demand times.

Accordingly, it is a prime object of the instant invention to provide a gas generator which generates gas according to the demand for gas.

Another object of the invention is to provide a hot gas generator which sustains fuel expenditure over a long period of time.

These and many other objects of the invention will become appreciated as the invention becomes completely understood in the light of the specification and the figures, wherein.

Figure 1:
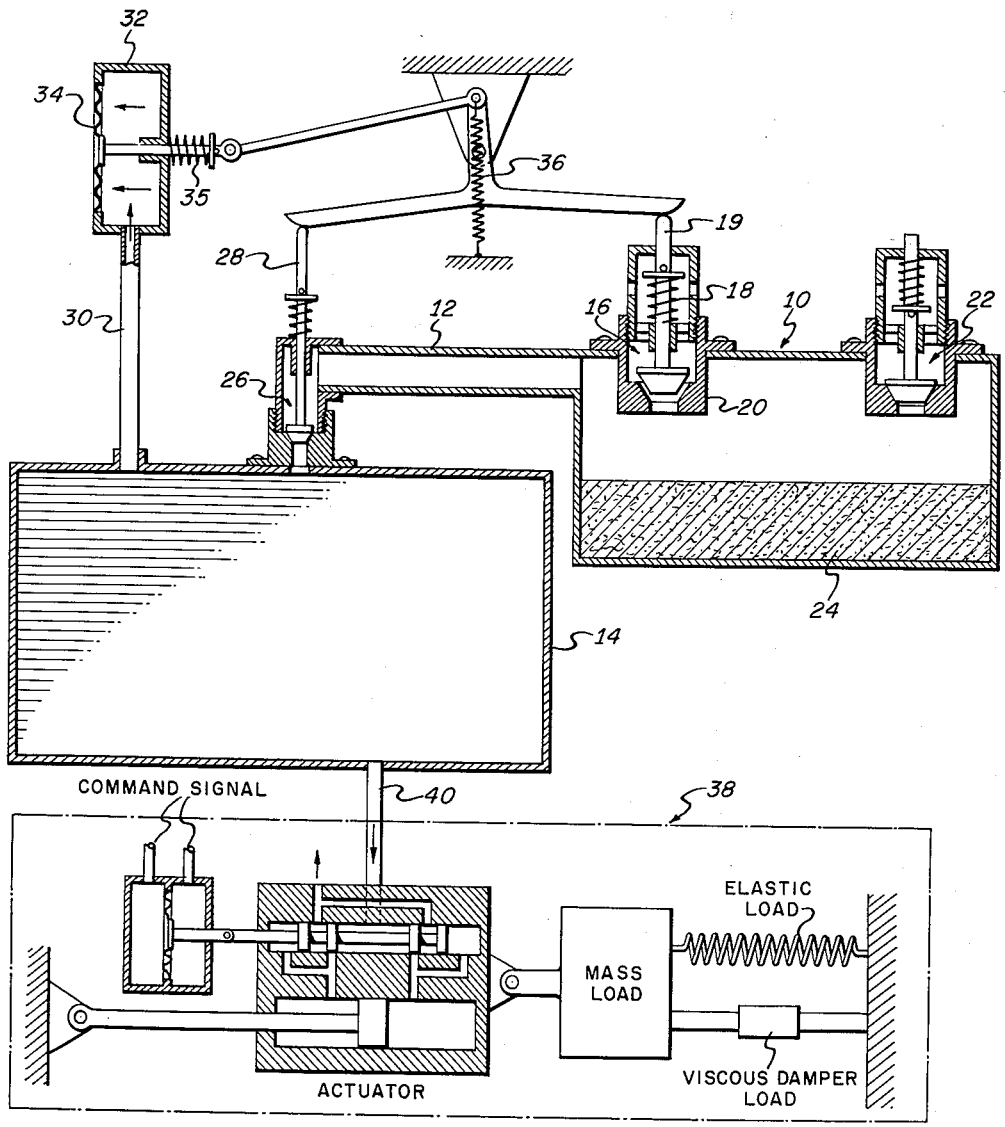
FIG. 1 is a cut-away functional diagram of one form of the invention.

Referring to FIG. 1 the fuel container or canister 10 is coupled via conduit 12 to an accumulator or demand chamber 14. Mounted within a wall of fuel container 10 is a dumping valve 16. Dumping valve 16 is provided with actuating arm 19 and is biased by the spring 18 which operates to unseat the valve head from the valve seat 20. A relief valve 22 is also mounted in the fuel container wall and, when necessary, operates to bleed off gas under pressure from within the fuel container 10. The fuel container 10 has enclosed therein solid material fuel 24 of the type generally used as a rocket propellant. Conduit 12 which connects the fuel container 10 to the accumulator 14 has enclosed therein a valve 26. Valve 26 is provided with an actuating arm 28 similar to arm 19.

Coupled to the accumulator 14 by conduit 30 is a pressure sensing device 32. Pressure sensing device 32, in this form of the invention, includes a diaphragm 34, one side of which is exposed to the pressure contained in the accumulator 14. The diaphragm 34 is biased against the accumulator pressure by a spring 35.

Mechanically linked to the sensing device 32 is the controlling mechanism 36. Controlling mechanism 36 is mechanically coupled to actuating arms 19 and 28 of valves 16 and 26 respectively.

A controllable system 38 adapted to be operated by hot gas is symbolically enclosed within dashed lines and includes an actuating device, an input device into which command signals are placed, and a load having elasticity and viscous damping. The actuating device of the system 38 receives, via conduit 40, varying volumes of hot gas.

Figure 4:
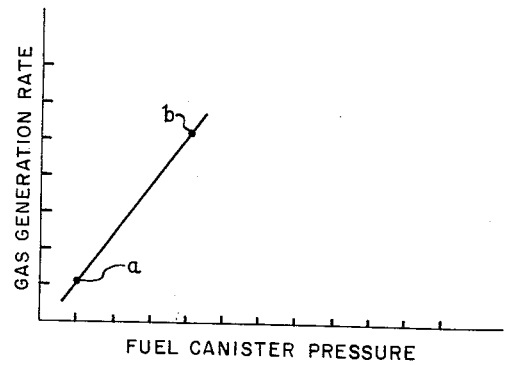
FIG. 4 is a graph of a typical fuel consumption vs. pressure curve.

The hot gas generated by consumption of the solid material fuel 24 is generated according to the characteristic curve shown in FIG. 4. That is to say, when the generator pressure on the fuel is at some low value (point $a$), the burning rate of the fuel is also at a low value; correspondingly when the generator pressure on the fuel is high (point $b$), the rate of fuel consumption is considerably higher.

In operation, with lower than normal pressure in the accumulator 14, the sensing device 32, sensing lower than normal pressure in the accumulator 14, operates the controller 36 to close valve 16 into its housing 20. At the same time, controller 36 allows the valve 26 to open, thus connecting the accumulator via conduit 12 to the fuel container 10. Hot gas which is generated in fuel container 10 is now allowed to escape into the accumulator 14 and thereby allow the gas pressure in accumulator 14 to build up to a predetermined amount. When the pressure in accumulator 14 reaches the predetermined amount the sensing device 32 senses the pressure and operates controller 36 which then operates to close valve 26 and open valve 16. Gas at a desired pressure is now trapped within the accumulator 14. Also, the high pressure gas which had been trapped within the fuel container and which augmented the fuel consumption rate is now allowed to escape via the opened valve 16 into the low pressure atmosphere. This dumping of the high pressure gas from the fuel container allows for a low fuel consumption rate (point $a$ of FIG. 4). In the event that the actuator of the system 38 calls for a quantity of hot gas because of command signal input, the accumulator 14 is immediately able to deliver the demand for hot gas. As the pressure within the accumulator 14 falls with the demand, the sensing device 32 realizes the lowered pressure and operates to close valve 16 and open valve 26. The residual gas within the accumulator now escapes back into the fuel container 10 and thereby further reduces the gas pressure within the accumulator 14. This has a momentary detrimental effect on the quantity of gas necessary to the actuator of the system 38. However, the gas pressure within the accumulator is very rapidly increased up to its predetermined value by the rapid generation of hot gas: the rapid generation resulting from the application of high pressure gas (point b) from the accumulator 14 on the fuel 24. At the instant the predetermined high pressure value is sensed by the sensing device 32, the controller 36 is operated to close the accumulator valve 26 and open the dumping valve 16. This operation is then repeated whenever accumulator 14 gas pressure falls as a result of demand or leakage.

Figure 2:
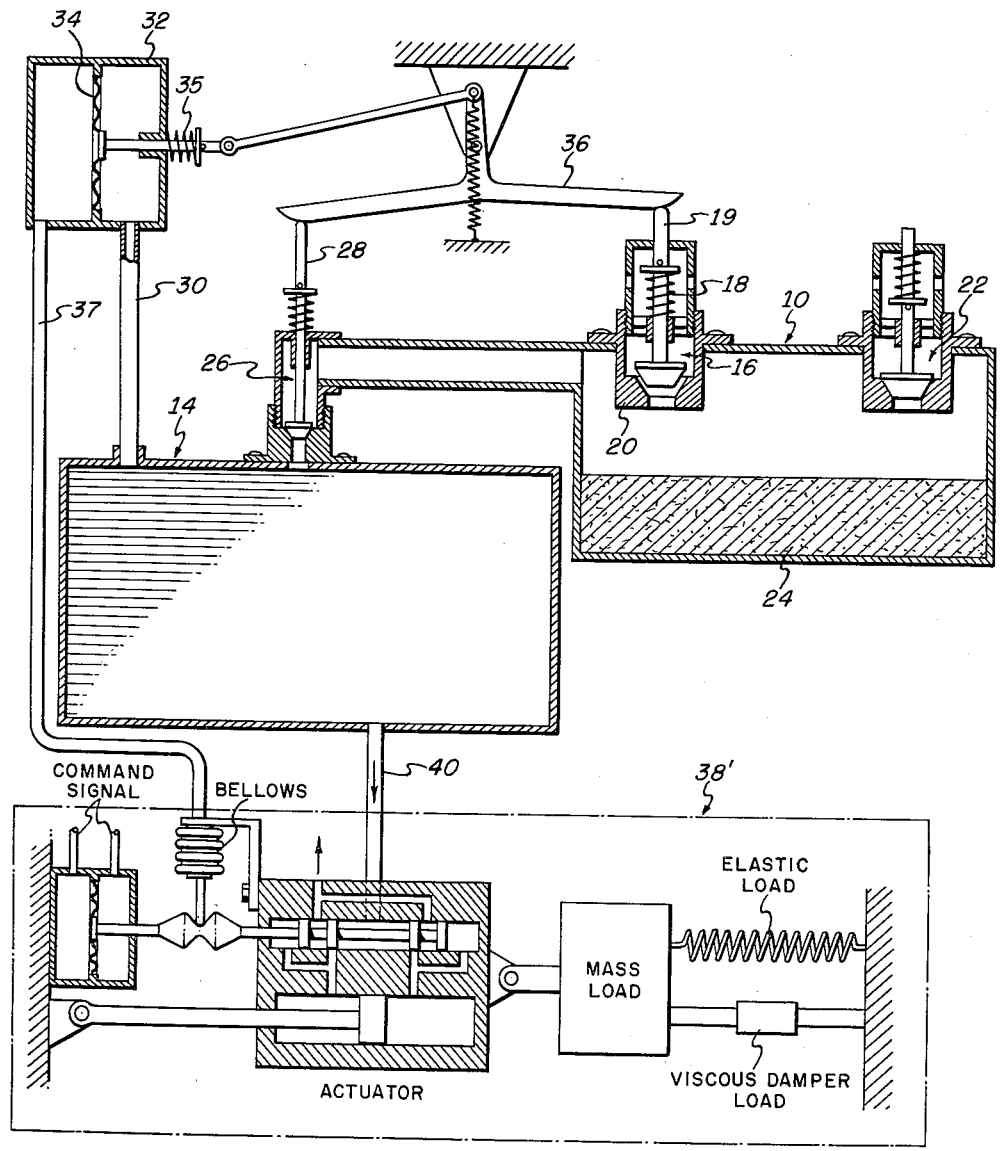
FIG. 2 is a cut-away functional diagram of another form of the instant invention employing a demand anticipation signal.

Referring to FIG. 2 the same embodiment of the invention as is shown in FIG. 1 is utilized with a single variation. In FIG. 2 a signal is impressed on the biased side of the diaphragm 34: the side of the diaphragm opposite that which is connected via conduit 30 to the accumulator 14. The signal applied to the opposing side of diaphragm 34 originates at the input device to the actuator of the system 38'. When a command signal is applied to the input device, a signal proportional to the size of the input signal is generated by the bellows and then applied via conduit 37 containing an incompressible fluid to the sensing device 32. In sensing device 32 the signal, so generated by the application of command signals, is subtracted from the bias already applied to the diaphragm 34 of sensing device 32.

With such an arrangement of element the future demand for hot gas can be sensed. That is, when a large command signal is applied to the actuator, thus calling for a large quantity of hot gas, the same large signal is applied to the already biased diaphragm 34. In sensing device 32 the large command signal is subtracted from the already present bias signal thus allowing the accumulator side of diaphragm 34 to operate controller 36 at a higher accumulator pressure than in the embodiment of FIG. 1. As the command signal to the actuator gets smaller and smaller the amount subtracted from the bias impressed on diaphragm 34 also gets smaller and smaller. For small signals, i.e. low actuator demand for hot gas, operation of the controller 36 is delayed until the accumulator 14 gas pressure reaches an amount lower than that for which it operated during high command input signals. Thus, as the input signal increases, this embodiment anticipates the need for hot gas, and starts the gas generation at an earlier time (allows smaller change in accumulator operating pressures than did the embodiment of FIG. 1). Correspondingly, with small input signals the generation of hot gas is delayed in time (until that time when the accumulator gas pressure falls considerably as in the embodiment of FIG. 1).

Figure 3:
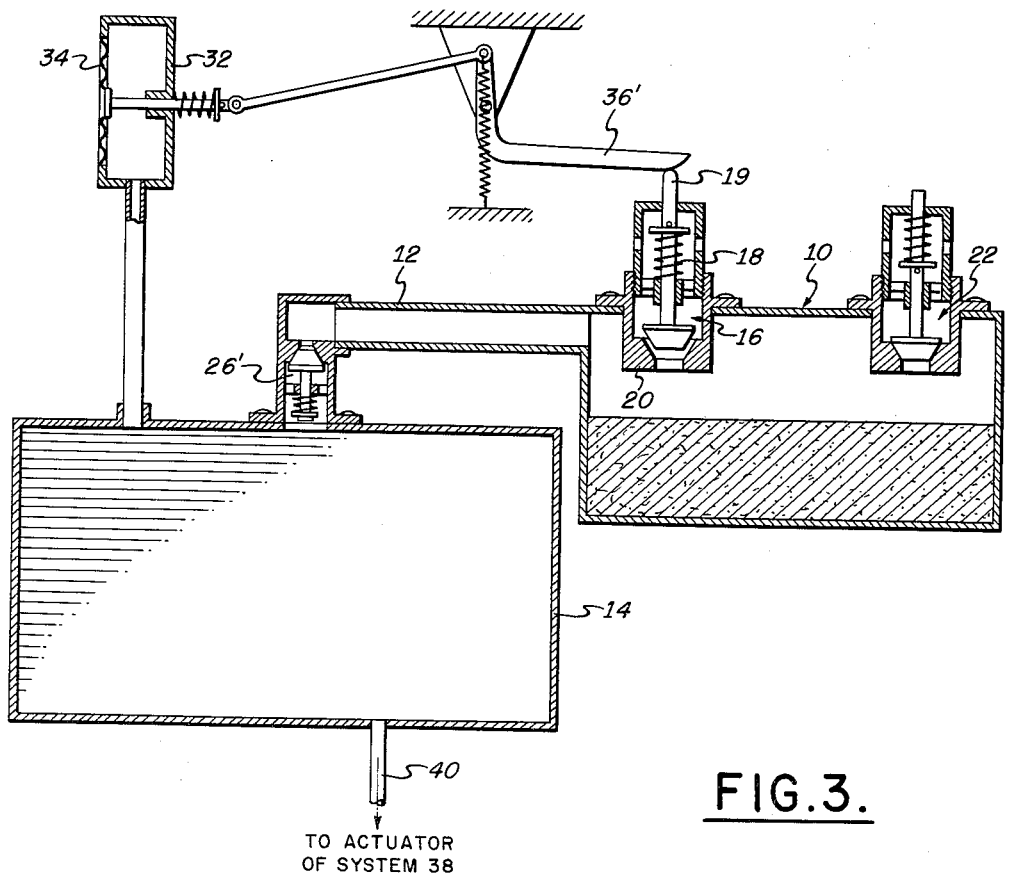
FIG. 3 is a cut-away functional diagram illustrating another species of the invention.

Referring to FIG. 3, a different form of the invention is shown. Controller 36' in this embodiment operates only dumping valve 16. A pressure operated valve 26' replaces the valve 26 of FIGS. 1 and 2. Valve 26' is a check valve which is biased in an open direction, i.e. a down direction, and is maintained in a closed position by the application of the accumulator gas pressure. The operation of this embodiment is identical to that of FIG. 1 with the exception that sensing device 32 operates the dumping valve 16 in accordance with pressure variations within the accumulator 14 and, at the same time, the self-controlled check valve 26' is likewise operated by the same variations in accumulator gas pressure.

Obviously many variations of this invention are possible in the light of the above teaching. Therefore it is to be understood that the embodiments shown are merely the preferred forms of the invention and that many other embodiments are possible, each employing the inventive concept.

What is claimed is:

1. A device for generating gas from fuel which produces gas at a rate that increases with increasing pressure on said fuel comprising means for containing and consuming fuel, accumulating means, valve means coupling said means for containing and consuming fuel to said accumulating means, and means responsive to pressure within said accumulating means relative to the ambient pressure to open said valve means when said pressure falls below a preset value and to close said valve means when said preset value is exceeded, whereby gas under pressure is passed from said accumulating means to said means for containing and consuming fuel when said valve means is opened to increase the pressure on said fuel and thereby speed up the generation of gas.

2. A device for generating gas from fuel which produces gas at a rate that increases with increasing pressure on said fuel comprising fuel containing means, accumulating means, first valve means coupling said accumulating means to said fuel containing means, said fuel containing means being provided with an escape valve, and means responsive to the pressure within said accumulating means to open and close said first valve means when said pressure respectively falls below and rises above a preset value, said pressure responsive means also operating to close and open said escape valve when said accumulating means gas pressure respectively falls below and rises above a preset value, whereby gas under pressure is vented when said escape valve is opened to reduce the pressure on said fuel and thereby slow down the generation of gas, and whereby gas under pressure is passed from said accumulating means to said fuel containing means when said valve means is opened to increase the pressure on said fuel and thereby speed up the generation of gas.

3. A device for generating gas from fuel which produces gas at a rate that increases with increasing pressure on said fuel comprising fuel containing means, accumulating means, valve means coupling said accumulating means to said fuel containing means, said fuel containing means being provided with an escape valve, means responsive to the pressure within said accumulating means, and valve actuating means operated by said pressure responsive means to open and close said valve means when said pressure within said accumulating means respectively falls below and rises above a preset value, said valve actuating means also closing and opening said escape valve when said accumulating means gas pressure respectively falls below and rises above a preset value, whereby gas under pressure is vented when said escape valve is opened to reduce the pressure on said fuel and thereby slow down the generation of gas, and whereby gas under pressure is passed from said accumulating means to said fuel containing means when said valve means is opened to increase the pressure on said fuel and thereby speed up the generation of gas.

4. A device for generating gas from fuel which produces gas at a rate that increases with increasing pressure on said fuel comprising fuel containing means, accumulating means, valve means coupling said accumulating means to said fuel containing means, said fuel containing means being provided with an escape valve, means responsive to the pressure within said accumulating means, valve actuating means operated by said pressure responsive means to open and close said valve means when said pressure within said accumulating means respectively falls below and rises above a preset value and escape valve actuating means operated by said pressure responsive means to open and close said escape valve when said accumulating means gas pressure respectively rises above and falls below a preset value, whereby gas under pressure is vented when said escape valve is opened to reduce the pressure on said fuel and thereby slow down the generation of gas, and whereby gas under pressure is passed from said accumulating means to said fuel containing means when said valve means is opened to increase the pressure on said fuel and thereby speed up the generation of gas.

5. A device for generating gas from fuel which produces gas at a rate that increases with increasing pressure on said fuel comprising fuel containing means, accumulating means, valve means coupling said fuel containing means to said accumulating means, means responsive to pressure within said accumulating means to open and close said valve means when said pressure respectively falls below and rises above a preset value, said fuel containing means being provided with an escape valve, and means responsive to pressure within said accumulating means to open and close said escape valve when the pressure within said accumulating means respectively rises above and falls below a preset value, whereby gas under pressure is vented when said escape valve is opened to reduce the pressure on said fuel and thereby slow down the generation of gas, and whereby gas under pressure is passed from said accumulating means to said fuel containing means when said valve means is opened to increase the pressure on said fuel and thereby speed up the generation of gas.

6. The structure of claim 2 including means generating a gas demand signal, means producing a pressure proportioned to that signal, and means algebraically adding the pressure that is proportional to said gas demand signal to the pressure that said means responsive to the pressure within said accumulating means responded to, thereby causing the opening and closing of said escape valve and said valve means to vary with the demand signal, thus anticipating the need for gas.

7. The structure of claim 3 including means generating a gas demand signal, means producing a pressure proportional to that signal, and means algebraically adding the pressure that is proportional to said gas demand signal to the pressure that said means responsive to the pressure within said accumulating means responded to, thereby causing the opening and closing of said escape valve and said valve means to vary with the demand signal, thus anticipating the need for gas.

8. The structure of claim 4 including means generating a gas demand signal, means producing a signal proportional to that signal, and means algebraically adding the pressure proportional to said gas demand signal to the pressure that said means responsive to the pressure within said accumulating means responded to, thereby causing the opening and closing of said escape valve and said valve means to vary with the demand signal, thus anticipating the need for gas.

9. The structure of claim 5 including means generating a gas demand signal, means producing a signal proportional to that signal, and means algebraically adding the pressure proportional to said gas demand signal to the pressure that said means responsive to the pressure within said accumulating means responded to, thereby causing the opening and closing of said escape valve and said valve means to vary with the demand signal, thus anticipating the need for gas.

10. Apparatus for generating gas from fuel which produces gas at a rate that increases with increasing pressure on the fuel comprising a fuel consuming container, a gas accumulating chamber, and a valve interconnecting said fuel consuming container and said gas accumulating chamber, said valve opening when the gas pressure within said accumulating chamber relative to the ambient pressure falls below a predetermined value and closing when that predetermined value is exceeded, whereby gas under pressure is passed from said accumulating chamber to said fuel consuming container when said valve is opened to increase the pressure on said fuel and thereby speed up the generation of gas.

11. Apparatus for generating gas from fuel which produces gas at a rate that increases with increasing pressure on the fuel comprising a fuel container, a gas accumulating container, a valve interconnecting said gas accumulating container and said fuel container, a relief valve in said fuel container, and means responsive to pressure within said accumulating container to open the interconnecting valve and close the relief valve when the pressure falls below a predetermined value and close the interconnecting valve and open the relief valve when that predetermined pressure is exceeded.

References Cited in the file of this patent

UNITED STATES PATENTS

| 1,935,123 | Lansing | Nov. 14, 1933 |
| 2,858,672 | Clark | Nov. 4, 1958 |

FOREIGN PATENTS

| 123,045 | Australia | Dec. 9, 1946 |